US012811495B2

(12) United States Patent
Hosotani

(10) Patent No.: US 12,811,495 B2
(45) Date of Patent: Nov. 24, 2026

(54) SWITCHING POWER SUPPLY SYSTEM DEVICE INCLUDING PLANAR ARRAY INDUCTOR

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 107 days.

(21) Appl. No.: 19/096,186

(22) Filed: Mar. 31, 2025

(65) Prior Publication Data

US 2025/0233515 A1 Jul. 17, 2025

Related U.S. Application Data

(63) Continuation of application No. PCT/JP2023/038301, filed on Oct. 24, 2023.

(30) Foreign Application Priority Data

Oct. 27, 2022 (JP) ................................ 2022-172341

(51) Int. Cl.
*H02M 3/00* (2006.01)
*H02M 3/158* (2006.01)

(52) U.S. Cl.
CPC ......... *H02M 3/003* (2021.05); *H02M 3/1584* (2013.01)

(58) Field of Classification Search
CPC ............................ H02M 3/003; H02M 3/1584
See application file for complete search history.

(56) References Cited

U.S. PATENT DOCUMENTS 5,877,668 A 3/1999 Moon et al.
8,294,544 B2 10/2012 Ikriannikov et al.
(Continued)

FOREIGN PATENT DOCUMENTS

JP H09-219324 A 8/1997
JP 2011-054585 A 3/2011
(Continued)

OTHER PUBLICATIONS

International Search Report issued in PCT/JP2023/038301; mailed Jan. 16, 2024.

*Primary Examiner* — Adolf D Berhane
(74) *Attorney, Agent, or Firm* — Studebaker Brackett PLLC

(57) ABSTRACT

A switching power supply system device includes a power conversion unit in which multiple power conversion circuits are coupled in parallel and an output voltage is obtained by combining outputs of switching operations of the multiple power conversion circuits, a switching control circuit to control the switching operations, and a planar array inductor constituting power inductors of the multiple power conversion circuits. The planar array inductor includes a magnetic body and multiple windings formed in an array relative to the magnetic body. Each of the multiple windings uses multiple layers of copper foil wiring lines laminated with a nonmagnetic and non-conductive adhesive layer interposed therebetween, and adjacent copper foil wiring lines in the multiple copper foil wiring lines are electrically coupled to each other using an interlayer via conductor. The magnetic body has a sheet-shaped magnetic material on inner and outer side portions of each of the multiple windings.

20 Claims, 10 Drawing Sheets

(56) References Cited

U.S. PATENT DOCUMENTS

| | | | | |
|---|---|---|---|---|
| 10,217,559 | B2 * | 2/2019 | Yang | H01F 27/2804 |
| 2019/0313531 | A1 * | 10/2019 | Silva | H01F 27/06 |

FOREIGN PATENT DOCUMENTS

| | | | |
|---|---|---|---|
| JP | 2019-121780 | A | 7/2019 |
| WO | 2019/208004 | A1 | 10/2019 |
| WO | 2020/035967 | A1 | 2/2020 |

* cited by examiner

SWITCHING POWER SUPPLY SYSTEM DEVICE INCLUDING PLANAR ARRAY INDUCTOR

CROSS-REFERENCE TO RELATED APPLICATIONS

This application claims benefit of priority to International Patent Application No. PCT/JP2023/038301, filed Oct. 24, 2023, and to Japanese Patent Application No. 2022-172341, filed Oct. 27, 2022, the entire contents of each are incorporated herein by reference.

BACKGROUND

Technical Field

The present disclosure relates to a switching power supply system device including multiple inductors and multiple power conversion circuits each including respective one of the multiple inductors.

Background Art

U.S. Pat. No. 8,294,544 describes an M-phase coupled inductor. The M-phase coupled inductor of U.S. Pat. No. 8,294,544 includes a ladder-type magnetic core having multiple inner legs each with a rectangular parallelepiped shape, and multiple windings each wound around the inner leg. A gap is provided between the multiple inner legs.

International Publication No. 2020/035967 describes a switching power supply system device. The switching power supply system device of International Publication No. 2020/035967 includes multiple switching circuit units and a controller. Each of the multiple switching circuit units includes an inductor.

Each of the multiple inductors constituting the switching circuit units includes multiple windings formed on a multilayer printed substrate and magnetic sheets disposed to sandwich the multilayer printed substrate.

SUMMARY

In a case of the ladder-type core as disclosed in U.S. Pat. No. 8,294,544, when the number of inductors to be coupled is increased, the inductors are disposed side by side in a lateral or longitudinal direction, and the shape becomes complicated. Further, in the case of the ladder-type core, the winding structure becomes more complicated as the number of inductors to be coupled is increased.

In the case of the ladder-type core as in U.S. Pat. No. 8,294,544 or in a case of sandwiching multiple windings between magnetic sheets as in International Publication No. 2020/035967, small spaces are formed between the multiple windings and a magnetic material (a magnetic body or a magnetic sheet). The spaces above have small relative permeability and large thermal resistance. Accordingly, in the structures above, when magnetic flux density is made high, the volume of the inductor increases.

Accordingly, the present disclosure provides a switching power supply system device including a thin planar array inductor capable of mitigating local heat generation and local increase in magnetic flux density.

The switching power supply system device including a planar array inductor according to the present disclosure includes a power conversion unit configured to couple multiple power conversion circuits in parallel and to obtain an output voltage by combining currents output by respective switching operations, a switching control circuit configured to control the switching operations, and a planar array inductor including multiple power inductors constituting the multiple power conversion circuits.

The planar array inductor includes a planar core, and multiple windings formed in an array relative to the planar core. Each of the multiple windings uses multiple layers of copper foil wiring lines laminated with a nonmagnetic and non-conductive adhesive layer interposed therebetween, and adjacent copper foil wiring lines in the multiple copper foil wiring lines are electrically coupled to each other using an interlayer via conductor. The planar core has a shape covering the multiple windings, and sheet-shaped magnetic materials are pressure-bonded and thermally cured on an inner side portion and an outer side portion of each of the multiple windings. The switching control circuit performs control such that, in an entire switching period for a series of switching operations based on the respective switching operations, a peak value of a current flowing through each of the multiple windings periodically changes, a winding in the multiple windings with the peak value of the current is consecutively moved with elapse of time to control periodic entire switching operations, and, in the planar core, a position and time at which density of magnetic flux becomes maximum are periodically moved, the magnetic flux being generated by the current of each of the multiple windings.

In this configuration, heat generated in the planar core and heat generated in the multiple windings are integrated using thermal conduction and are uniformly distributed in a planar manner, and a local increase in magnetic flux density in the planar core and local heat generation are mitigated.

According to the present disclosure, a switching power supply system device including a planar array inductor may mitigate local heat generation and a local increase in magnetic flux density while achieving a reduction in thickness.

DETAILED DESCRIPTION

First Embodiment

A switching power supply system device including a planar array inductor according to a first embodiment of the present disclosure will be described with reference to the drawings.

(Planar Array Inductor)

Figure 1:
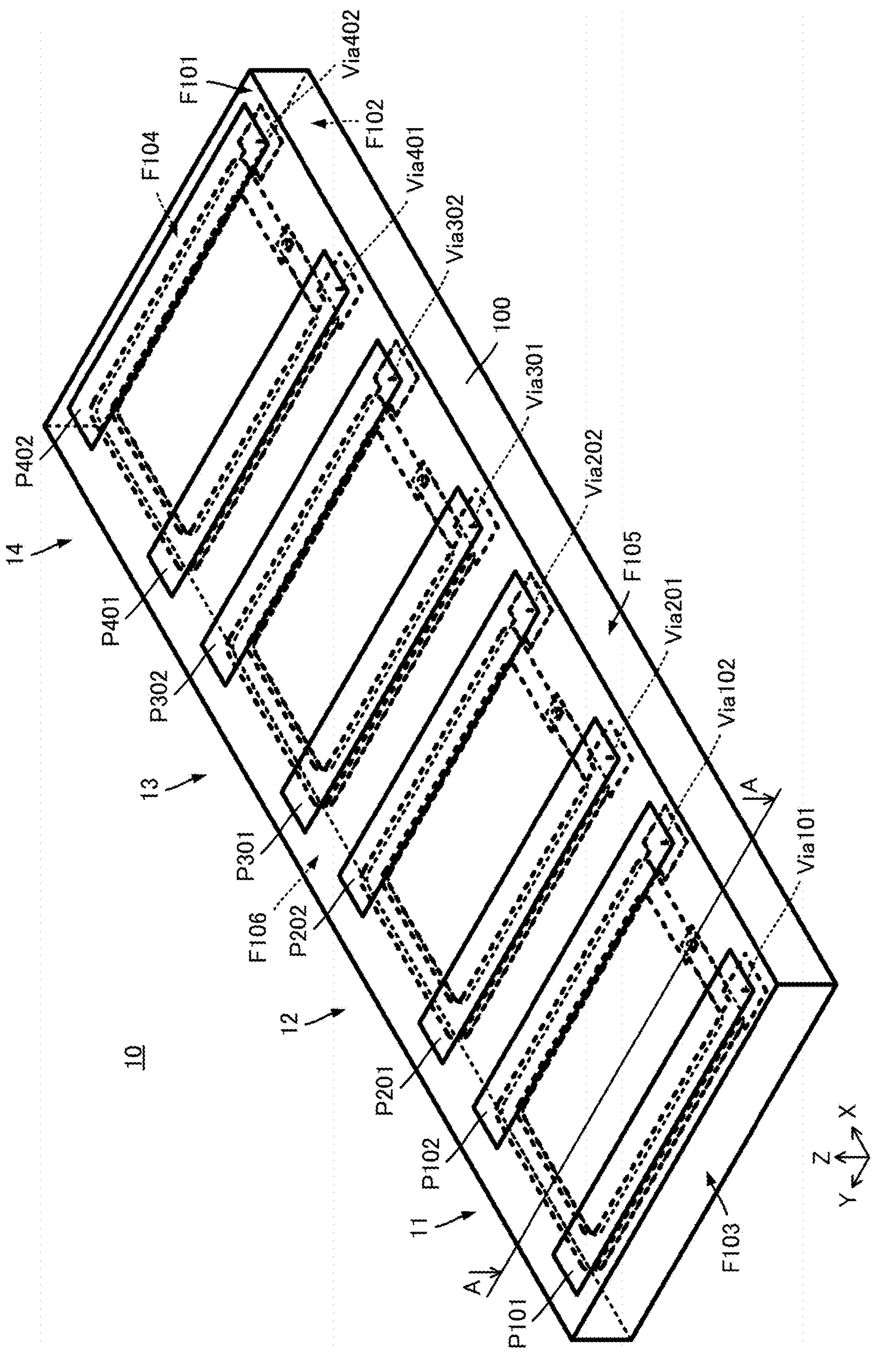
FIG. 1 is a perspective view of a planar array inductor according to a first embodiment of the present disclosure.
Figure 2:
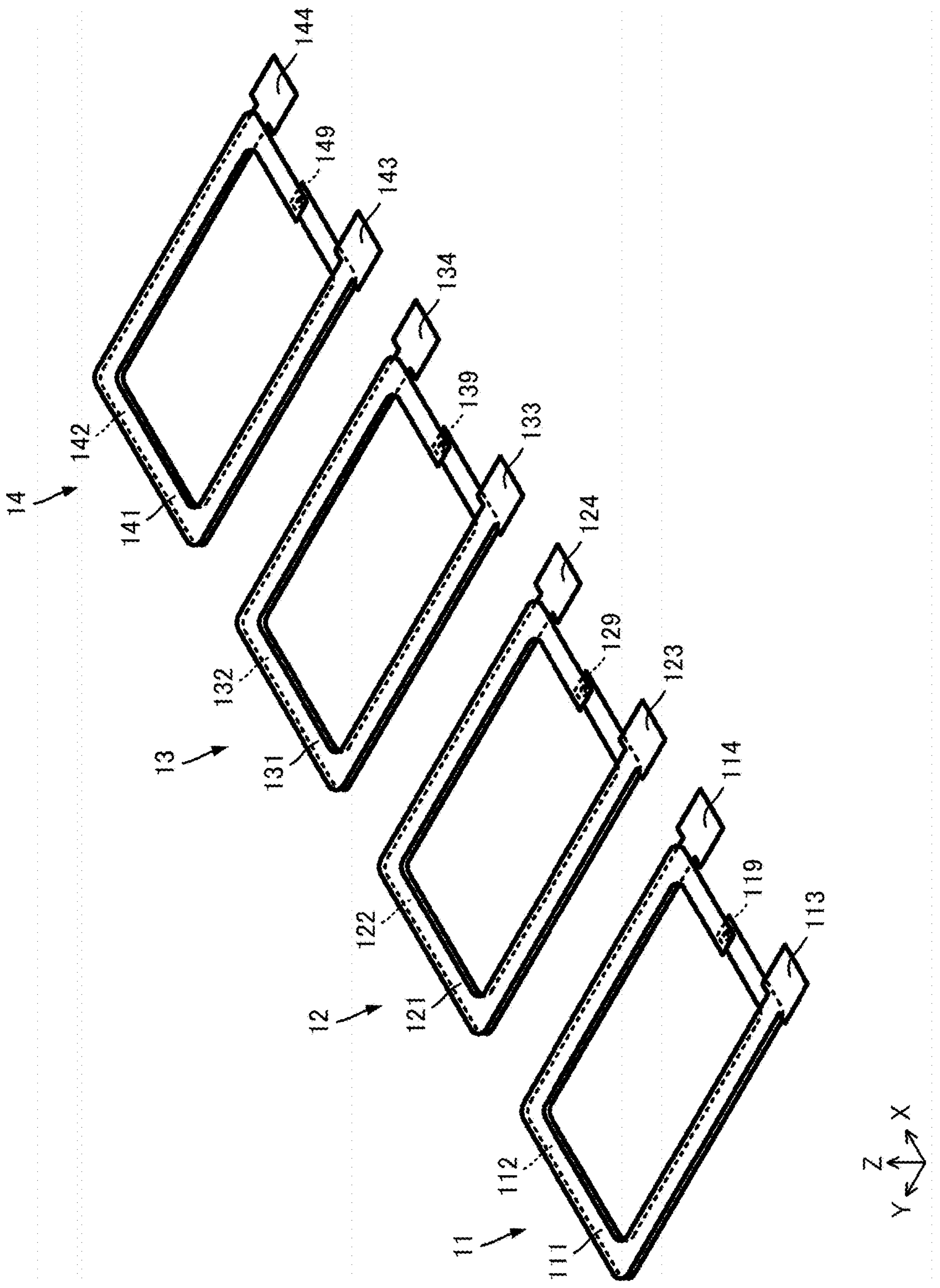
FIG. 2 is a perspective view of multiple windings of the planar array inductor according to the first embodiment of the present disclosure.
Figure 3:
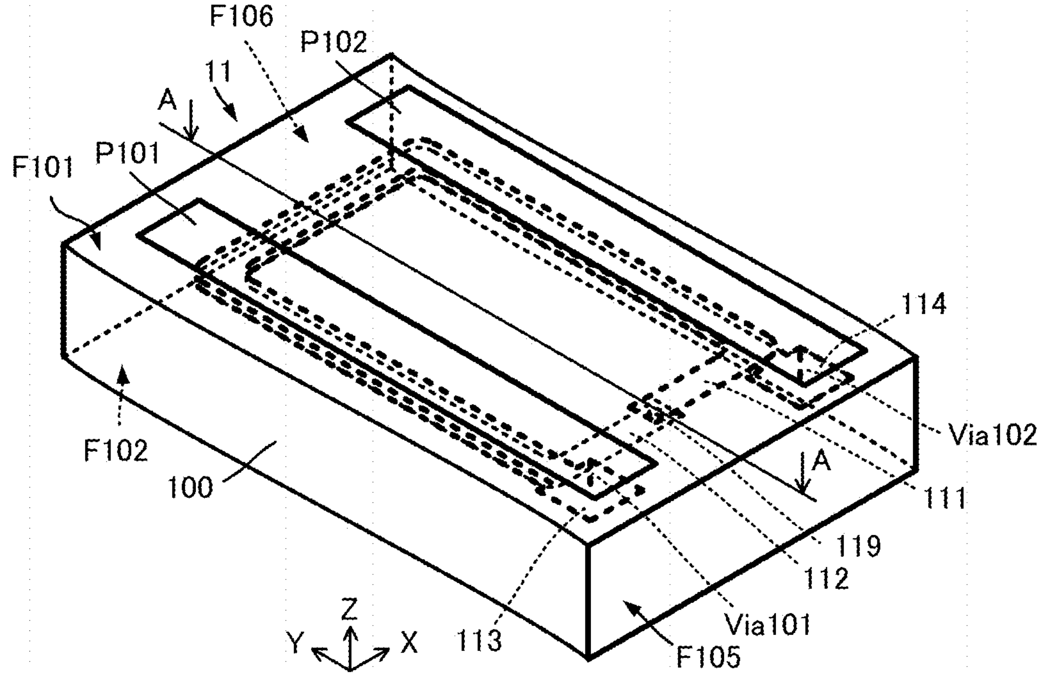
FIG. 3 is a perspective view of one inductor constituting the planar array inductor according to the first embodiment of the present disclosure.
Figure 4:
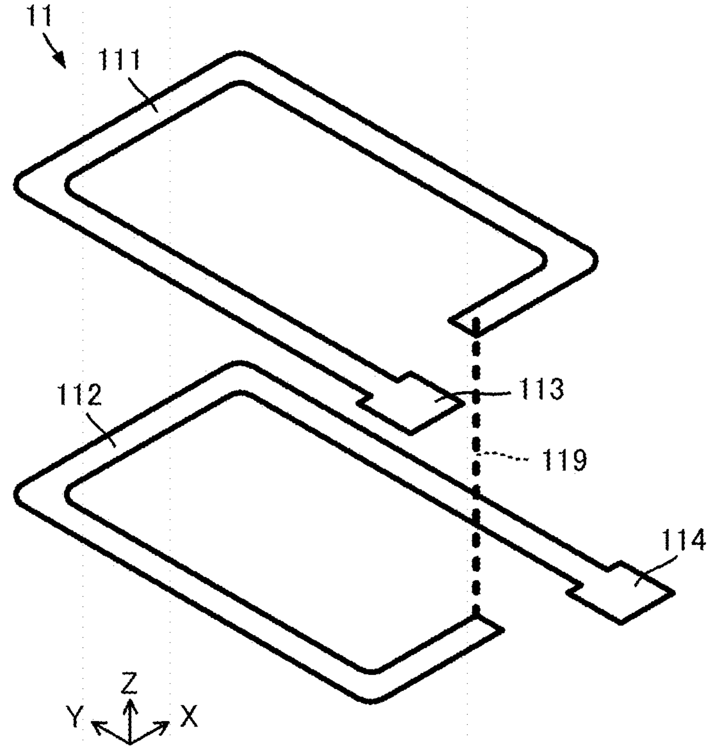
FIG. 4 is an exploded perspective view of one inductor constituting the planar array inductor according to the first embodiment of the present disclosure.
Figure 5:
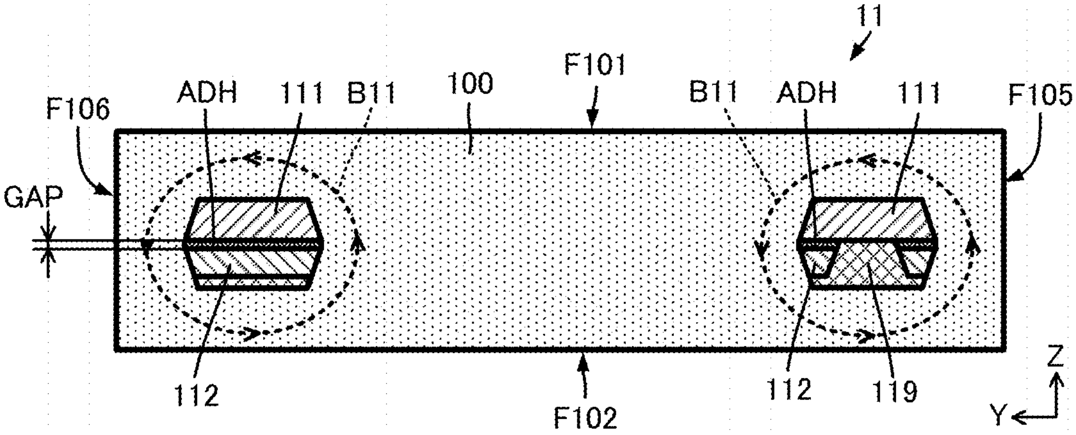
FIG. 5 is a sectional view of the planar array inductor according to the first embodiment of the present disclosure.

FIG. 1 is a perspective view of the planar array inductor according to the first embodiment of the present disclosure. FIG. 2 is a perspective view of multiple windings of the planar array inductor according to the first embodiment of the present disclosure. FIG. 3 is a perspective view of one inductor constituting the planar array inductor according to the first embodiment of the present disclosure. FIG. 4 is an exploded perspective view of one inductor constituting the planar array inductor according to the first embodiment of the present disclosure. FIG. 5 is a sectional view of the planar array inductor according to the first embodiment of the present disclosure. FIG. 5 illustrates a cross section taken along line A-A in FIG. 1 and FIG. 3. In the drawings, three orthogonal axes are referred to as an X-axis, a Y-axis, and a Z-axis, but these are axis names used to facilitate description, and do not limit the direction or the like of a planar array inductor 10 at the time of use, for example.

As illustrated in FIGS. 1, 2, 3, 4, and 5, the planar array inductor 10 includes inductors 11, 12, 13, and 14. Although the planar array inductor 10 is constituted of four inductors 11 to 14 in the present embodiment, the number of inductors is not limited to four as long as it is plural.

The planar array inductor 10 includes a magnetic body 100. The planar array inductor 10 includes multiple winding conductors 111 and 112 and an interlayer via conductor 119 constituting the inductor 11, multiple winding conductors 121 and 122 and an interlayer via conductor 129 constituting the inductor 12, multiple winding conductors 131 and 132 and an interlayer via conductor 139 constituting the inductor 13, and multiple winding conductors 141 and 142 and an interlayer via conductor 149 constituting the inductor 14.

The planar array inductor 10 includes multiple external terminals P101 and P102 for the inductor 11, multiple external terminals P201 and P202 for the inductor 12, multiple external terminals P301 and P302 for the inductor 13, and multiple external terminals P401 and P402 for the inductor 14. The planar array inductor 10 includes outer coupling-use via conductors Via101 and Via102 for the inductor 11, outer coupling-use via conductors Via201 and Via202 for the inductor 12, outer coupling-use via conductors Via301 and Via302 for the inductor 13, and outer coupling-use via conductors Via401 and Via402 for the inductor 14.

(Configuration of Inductor 11)

As illustrated in FIGS. 3 and 4, the winding conductors 111 and 112 each have a substantially one turn winding shape. The winding conductors 111 and 112 are each formed of a linear (ribbon-shaped) copper foil having a predetermined width.

The winding conductors 111 and 112 are laminated such that the respective planes are parallel to each other. At this time, the winding conductors 111 and 112 are disposed to face each other over substantially the entire circumference.

The winding conductors 111 and 112 are disposed with an adhesive layer ADH (see FIG. 5) interposed therebetween, and the winding conductors 111 and 112 are bonded to each other by the adhesive layer ADH. At this time, the adhesive layer ADH is disposed on substantially the entire surface where the winding conductors 111 and 112 face each other. The adhesive layer ADH is made of a material having a nonmagnetic property and non-conductivity (an insulating property).

A pad conductor 113 for outer coupling is coupled to one end portion of the winding conductor 111. The other end portion of the winding conductor 111 is coupled to one end portion of the winding conductor 112 through the interlayer via conductor 119. Thus, the winding conductors 111 and 112 are electrically coupled to each other with the interlayer via conductor 119. A pad conductor 114 for outer coupling is coupled to the other end portion of the winding conductor 112. With the configuration above, the inductor 11 realizes a thin helical winding having the pad conductor 113 at one end and the pad conductor 114 at the other end.

The helical winding of the inductor 11 is covered with the magnetic body 100. More specifically, the magnetic body 100 is filled in an inner side portion and an outer side portion of the helical winding of the inductor 11 and has a shape without a gap.

The magnetic body 100 is formed using, for example, a metal composite type magnetic material (a metal composite material). More specifically, the magnetic material of the magnetic body 100 is a material in which multiple metal magnetic particles, covered with an insulating resin film such as an epoxy film, are contained in a thermosetting resin.

The magnetic body 100 has a main surface F101 and a main surface F102. The multiple external terminals P101 and P102 are formed on the main surface F101 of the magnetic body 100. The external terminals P101 and P102 each have, for example, a rectangular shape when viewed in plan (the Z-axis direction). The external terminals P101 and P102 each correspond to an "outer electrode" of the present disclosure. The external terminals P101 and P102 are each formed by metal plating using gold (Au) or nickel (Ni).

The pad conductor 113 is coupled to the external terminal P101 through the outer coupling-use via conductor Via101 formed in the magnetic body 100. The pad conductor 114 is coupled to the external terminal P102 through the outer coupling-use via conductor Via102 formed in the magnetic body 100. The outer coupling-use via conductor Via101 is integrally formed with the external terminal P101 and the outer coupling-use via conductor Via102 is integrally formed with the external terminal P102, for example.

With the configuration above, the inductor 11 realizes a planar inductor having a planar core whose thickness (a dimension in the Z-axis direction in the drawings) is smaller than dimensions in other directions (dimensions in the X-axis direction and the Y-axis direction in the drawings) constituting the plane along which the winding conductor is formed.

(Multiple Inductors 12, 13, and 14)

The basic configuration of each of the multiple inductors 12, 13, and 14 is the same as that of the inductor 11. The configuration of each of the multiple inductors 12, 13, and 14, therefore, will schematically be described.

(Inductor 12)

The winding conductors 121 and 122 are laminated and coupled to each other via the interlayer via conductor 129.

Thus, the inductor 12 realizes a helical winding. The helical winding of the inductor 12 is covered with the magnetic body 100.

One end portion of the winding conductor 121 is coupled to the external terminal P201 through a pad conductor 123 and the outer coupling-use via conductor Via201. The other end portion of the winding conductor 122 is coupled to the external terminal P202 through a pad conductor 124 and the outer coupling-use via conductor Via202.

(Inductor 13)

The winding conductors 131 and 132 are laminated and coupled to each other via the interlayer via conductor 139. Thus, the inductor 13 realizes a helical winding. The helical winding of the inductor 13 is covered with the magnetic body 100.

One end portion of the winding conductor 131 is coupled to the external terminal P301 through a pad conductor 133 and the outer coupling-use via conductor Via301. The other end portion of the winding conductor 132 is coupled to the external terminal P302 through a pad conductor 134 and the outer coupling-use via conductor Via302.

(Inductor 14)

The winding conductors 141 and 142 are laminated and coupled to each other via the interlayer via conductor 149. Thus, the inductor 14 realizes a helical winding. The helical winding of the inductor 14 is covered with the magnetic body 100.

One end portion of the winding conductor 141 is coupled to the external terminal P401 through a pad conductor 143 and the outer coupling-use via conductor Via401. The other end portion of the winding conductor 142 is coupled to the external terminal P402 through a pad conductor 144 and the outer coupling-use via conductor Via402.

(Overall Configuration of Planar Array Inductor 10)

The helical winding of the inductor 11, the helical winding of the inductor 12, the helical winding of the inductor 13, and the helical winding of the inductor 14 described above are disposed in an array at intervals in a direction (the X-axis direction in the drawings) orthogonal to a direction in which the multiple windings thereof are laminated (the Z-axis direction in the drawings).

The helical winding of the inductor 11, the helical winding of the inductor 12, the helical winding of the inductor 13, and the helical winding of the inductor 14 disposed in an array in the manner described above are covered with the magnetic body 100. Thus, the multiple inductors 11, 12, 13, and 14 are disposed side by side in a planar manner in a direction orthogonal to a thickness direction of the magnetic body 100 being a planar core. As a result, the planar array inductor 10 has a thin outer shape.

In other words, as illustrated in FIG. 1, the magnetic body 100 has a flat plate shape in which a dimension in the thickness direction (a length in the Z-axis direction) is shorter than dimensions in other directions (lengths in the X-axis direction and the Y-axis direction). The magnetic body 100 has the main surfaces F101 and F102 orthogonal to the thickness direction, has side surfaces F103 and F104 on both sides in a direction in which the multiple inductors 11, 12, 13, and 14 are disposed side by side, and has side surfaces F105 and F106 orthogonal to the main surfaces F101 and F102 and the side surfaces F103 and F104. The helical winding of the inductor 11, the helical winding of the inductor 12, the helical winding of the inductor 13, and the helical winding of the inductor 14 are disposed side by side between the side surfaces F103 and F104 in a direction parallel to the main surfaces F101 and F102.

In the configuration above, the helical winding of the inductor 11, the helical winding of the inductor 12, the helical winding of the inductor 13, and the helical winding of the inductor 14 are covered with the magnetic body 100 having no local gap. In other words, there is no gap in the magnetic body 100, and further, there is no gap between the magnetic body 100 and the winding conductor of each of the multiple inductors 11, 12, 13, and 14 as well. More specifically, no gap is present between the magnetic body 100 and the inductors 11, 12, 13, and 14 on both the inner side portion and the outer side portion of the winding conductor of each of the multiple inductors 11, 12, 13, and 14, and the magnetic body 100 is in close contact with the inductors 11, 12, 13, and 14.

Thus, the planar array inductor 10 can mitigate a local lowering in relative permeability. As a result, even when the planar array inductor 10 is small and thin, inductance of each of the multiple inductors 11, 12, 13, and 14 can be increased.

The planar array inductor 10 has no portion where thermal resistance is locally high. Further, since the magnetic body 100 is made of a metal composite type magnetic material, the planar array inductor 10 has high thermal conductivity and can make thermal resistance low. Thus, heat generated by the flow of current through the multiple inductors 11, 12, 13, and 14 of the planar array inductor 10 does not remain in a local portion but is diffused over the entire magnetic body 100. Thus, the planar array inductor 10 can mitigate local heat generation.

In the configuration above, for example, when the number of inductors is increased, the number of inductors disposed side by side in a planar manner only need be increased, and the area of the magnetic body 100 need be increased accordingly. On the other hand, when the number of inductors is decreased, the number of inductors disposed side by side in a planar manner only need be decreased, and the area of the magnetic body 100 need be reduced accordingly. As a result, the shape of the planar array inductor 10 does not become complicated when the number of inductors is changed.

Note that the helical winding of the inductor 11, the helical winding of the inductor 12, the helical winding of the inductor 13, and the helical winding of the inductor 14 are disposed such that end portions coupled to the respective external terminals are on the same side of the respective helical windings.

(Method for Manufacturing Planar Array Inductor 10)

FIGS. 6A, 6B, 6C, 6D, and 6E are each a side sectional view illustrating a state in each process in the manufacturing process of the planar array inductor according to the first embodiment of the present disclosure. Note that, in the present embodiment, one planar array inductor is illustrated. However, in actual manufacturing, multiple planar array inductors are formed and individuated in a so-called multi-state in which multiple planar array inductors can be formed. In addition, although only the portion of the inductor 11 is illustrated in FIGS. 6A to 6E, the portions of the inductors 12, 13, and 14 are also formed together with the portion of the inductor 11.

Figure 6A:
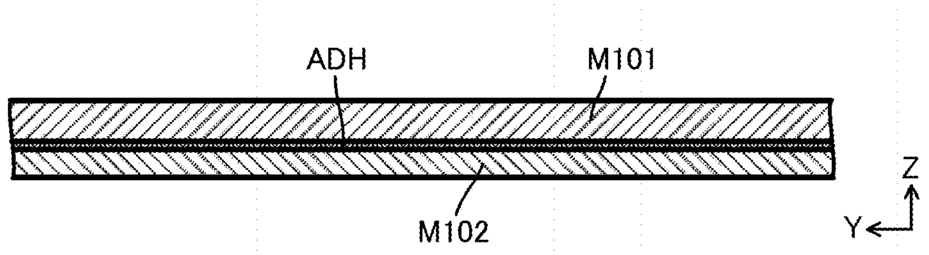
FIGS. 6A, 6B, 6C, 6D, and 6E are each a side sectional view illustrating a state in each step in manufacturing process of the planar array inductor according to the first embodiment of the present disclosure.

As illustrated in FIG. 6A, copper foils M101 and M102 are bonded to each other with the nonmagnetic and non-conductive adhesive layer (an adhesive) ADH. At this time, a vacuum press is used, for example.

The adhesive layer ADH is made thinner than the copper foils M101 and M102, so that the copper foils M101 and M102 are bonded with a small gap GAP therebetween. Thus, the winding conductors 111 and 112 of the inductor 11 are disposed while being fixed with the small gap GAP therebetween.

Figure 6B:
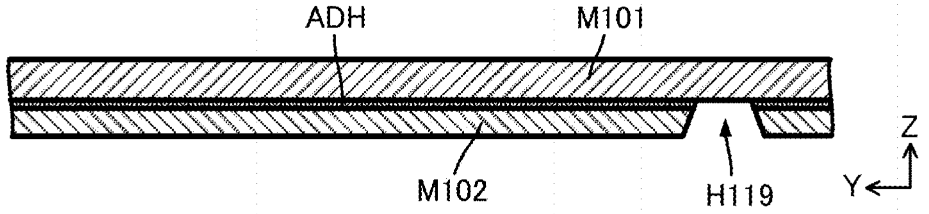

As illustrated in FIG. 6B, a recess H119 passing through the copper foil M102 and the adhesive layer ADH is formed. A portion of the recess H119 in the copper foil M102 is formed by laser processing, and a portion of the recess H119 in the adhesive layer ADH is formed by etching.

Figure 6C:
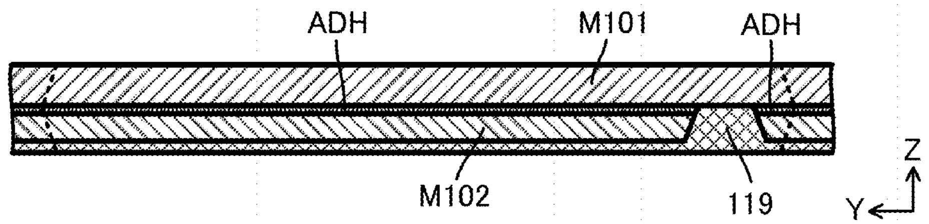

As illustrated in FIG. 6C, electrolytic plating is performed to fill the recess H119 with copper. Thus, the interlayer via conductor 119 is formed.

Figure 6D:
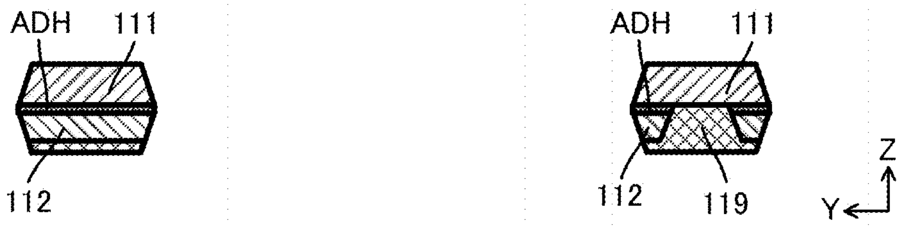

As illustrated in FIG. 6D, a multilayer body in which the copper foils M101 and M102 are bonded together with the adhesive layer ADH is subjected to pattern etching, thereby forming a helical winding in which the winding conductors 111 and 112 are bonded with the adhesive layer ADH.

Figure 6E:
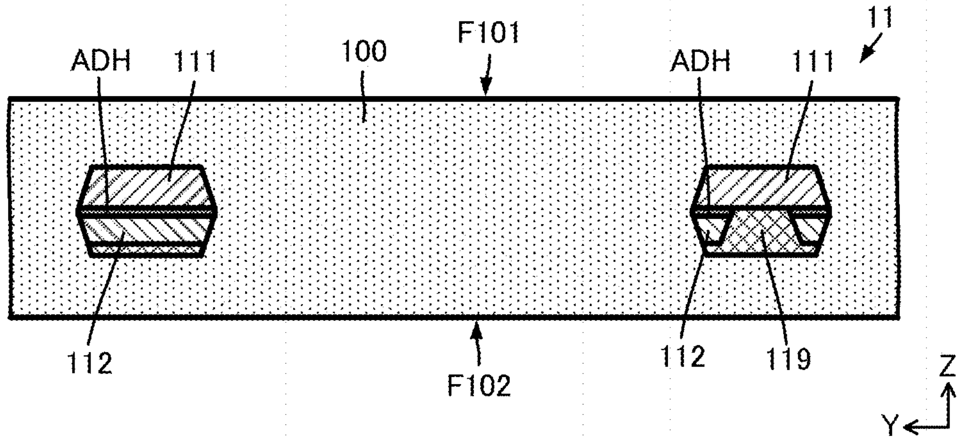

As illustrated in FIG. 6E, sheet-shaped thermosetting magnetic materials are pressure-bonded and thermally cured (heat-vacuum press is performed) to cover the helical winding. Thus, the magnetic material is cured at high density, and the magnetic body 100 (the planar core) is formed in close contact with both the inner side portion and the outer side portion of the helical winding.

Thereafter, although not illustrated, the magnetic body 100 is subjected to laser processing to form a hole for an outer coupling-use via conductor, and the hole is filled with copper-plating, nickel-plating, and Au-plating, thereby forming the outer coupling-use via conductors Via101 and Via102 and the external terminals P101 and P102.

(Switching Power Supply System Device 80)

Figure 7:
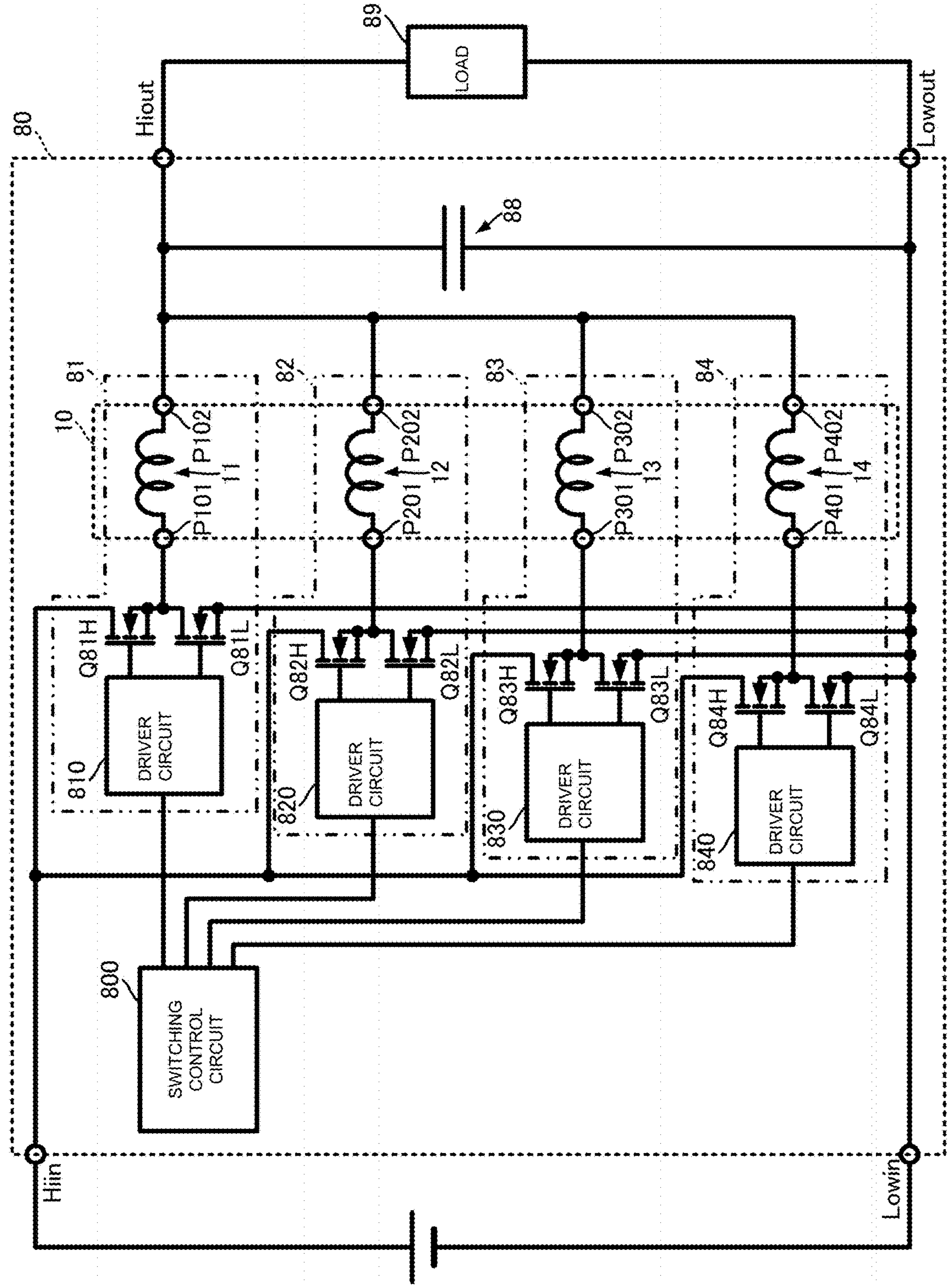
FIG. 7 is an equivalent circuit diagram of the switching power supply system device according to the first embodiment of the present disclosure.

FIG. 7 is an equivalent circuit diagram of the switching power supply system device according to the first embodiment of the present disclosure. As illustrated in FIG. 7, a switching power supply system device 80 includes the planar array inductor 10 being a power inductor, a switching control circuit 800, power conversion circuits 81, 82, 83, and 84, and a capacitor 88.

A DC power supply is coupled between a Hi-side power supply input terminal and a Low-side power supply input terminal of the switching power supply system device 80. The Hi-side power supply input terminal is coupled to a positive electrode of the DC power supply, and the Low-side power supply input terminal is coupled to a negative electrode of the DC power supply.

Schematically, the switching power supply system device 80 constitutes a power conversion unit by coupling the multiple power conversion circuits 81 to 84 in parallel, and obtains an output voltage by combining outputs of switching operations of the respective multiple power conversion circuits 81 to 84.

The power conversion circuit 81 includes a driver circuit 810, switching elements Q81H and Q81L, and the inductor 11 of the planar array inductor 10. The driver circuit 810 is realized by an analog IC. The switching elements Q81H and Q81L are each a power semiconductor element, and for example, a power MOSFET.

The driver circuit 810 is coupled to gate terminals of the switching elements Q81H and Q81L. The driver circuit 810 performs switching control of the switching elements Q81H and Q81L based on a control signal for the power conversion circuit 81 (for the driver circuit 810) from the switching control circuit 800.

A drain terminal of the switching element Q81H is coupled to the Hi-side power supply input terminal of the switching power supply system device 80. A source terminal of the switching element Q81H is coupled to a drain terminal of the switching element Q81L. A source terminal of the switching element Q81L is coupled to the Low-side power supply input terminal of the switching power supply system device 80 (a terminal coupled to a reference electric potential line). The reference electric potential line couples the Low-side power supply input terminal (a terminal coupled to the negative electrode of the DC power supply) of the switching power supply system device 80 and a Low-side output terminal (a terminal coupled to a negative electrode of a load 89) of the switching power supply system device 80.

A node between the source terminal of the switching element Q81H and the drain terminal of the switching element Q81L are coupled to the external terminal P101 of the planar array inductor 10. The external terminal P101 is coupled to one side terminal of the inductor 11. The other side terminal of the inductor 11 is coupled to the external terminal P102.

The power conversion circuit 82 includes a driver circuit 820, switching elements Q82H and Q82L, and the inductor 12 of the planar array inductor 10. The driver circuit 820 is realized by an analog IC. The switching elements Q82H and Q82L are each a power semiconductor element, and for example, a power MOSFET.

The driver circuit 820 is coupled to gate terminals of the switching elements Q82H and Q82L. The driver circuit 820 performs switching control of the switching elements Q82H and Q82L based on a control signal for the power conversion circuit 82 (for the driver circuit 820) from the switching control circuit 800.

A drain terminal of the switching element Q82H is coupled to the Hi-side power supply input terminal of the switching power supply system device 80. A source terminal of the switching element Q82H is coupled to a drain terminal of the switching element Q82L. A source terminal of the switching element Q82L is coupled to the Low-side power supply input terminal of the switching power supply system device 80 (a terminal coupled to the reference electric potential line).

A node between the source terminal of the switching element Q82H and the drain terminal of the switching element Q82L are coupled to the external terminal P201 of the planar array inductor 10. The external terminal P201 is coupled to one side terminal of the inductor 12. The other side terminal of the inductor 12 is coupled to the external terminal P202.

The power conversion circuit 83 includes a driver circuit 830, switching elements Q83H and Q83L, and the inductor 13 of the planar array inductor 10. The driver circuit 830 is realized by an analog IC. The switching elements Q83H and Q83L are each a power semiconductor element, and for example, a power MOSFET.

The driver circuit 830 is coupled to gate terminals of the switching elements Q83H and Q83L. The driver circuit 830 performs switching control of the switching elements Q83H and Q83L based on a control signal for the power conversion circuit 83 (for the driver circuit 830) from the switching control circuit 800.

A drain terminal of the switching element Q83H is coupled to the Hi-side power supply input terminal of the switching power supply system device 80. A source terminal of the switching element Q83H is coupled to a drain terminal of the switching element Q83L. A source terminal of the switching element Q83L is coupled to the Low-side power supply input terminal of the switching power supply system device 80 (a terminal coupled to the reference electric potential line).

A node between the source terminal of the switching element Q83H and the drain terminal of the switching element Q83L are coupled to the external terminal P301 of the planar array inductor 10. The external terminal P301 is coupled to one side terminal of the inductor 13. The other side terminal of the inductor 13 is coupled to the external terminal P302.

The power conversion circuit 84 includes a driver circuit 840, switching elements Q84H and Q84L, and the inductor 14 of the planar array inductor 10. The driver circuit 840 is realized by an analog IC. The switching elements Q84H and Q84L are each a power semiconductor element, and for example, a power MOSFET.

The driver circuit 840 is coupled to gate terminals of the switching elements Q84H and Q84L. The driver circuit 840 performs switching control of the switching elements Q84H and Q84L based on a control signal for the power conversion circuit 84 (for the driver circuit 840) from the switching control circuit 800.

A drain terminal of the switching element Q84H is coupled to the Hi-side power supply input terminal of the switching power supply system device 80. A source terminal of the switching element Q84H is coupled to a drain terminal of the switching element Q84L. A source terminal of the switching element Q84L is coupled to the Low-side power supply input terminal of the switching power supply system device 80 (a terminal coupled to the reference electric potential line).

A node between the source terminal of the switching element Q84H and the drain terminal of the switching element Q84L are coupled to the external terminal P401 of the planar array inductor 10. The external terminal P401 is coupled to one side terminal of the inductor 14. The other side terminal of the inductor 14 is coupled to the external terminal P402.

The external terminals P102, P202, P302, and P402 are coupled to one another, and the node between them is coupled to a Hi-side output terminal of the switching power supply system device 80.

The capacitor 88 is a smoothing capacitor, and is coupled between the Hi-side output terminal and the Low-side output terminal coupled to the reference electric potential line.

(Operation of Switching Power Supply System Device 80)

In the configuration above, the switching control circuit 800 performs multi-phase control depending on an output voltage and an output current to the load 89. More specifically, the switching control circuit 800 selects the power conversion circuit to be driven depending on the output voltage and the output current. The switching control circuit 800 generates a control signal so as to sequentially drive the power conversion circuit to be driven depending on a period of the switching operation of the switching element of the power conversion circuit to be driven.

By performing such multi-phase control, the switching power supply system device 80 can periodically change a peak value of the current, flowing through each of the multiple windings constituting the multiple inductors 11, 12, 13, and 14, in the period of the switching operation. Further, the switching power supply system device 80 can periodically move, in the magnetic body 100, a position and time at which density of magnetic flux becomes the maximum, the magnetic flux being generated by the current of each of the multiple windings constituting the multiple inductors 11, 12, 13, and 14 in the magnetic body 100.

Thus, the switching power supply system device 80 including the planar array inductor 10 can integrate heat using thermal conduction and uniformly distribute the heat in a planar manner, the heat being generated in the magnetic body 100 and in the multiple windings constituting the multiple inductors 11, 12, 13, and 14. As a result, the switching power supply system device 80 including the planar array inductor 10 can mitigate a local increase in magnetic flux density of the magnetic body 100 while being thin.

In particular, with not including a gap inside, the planar array inductor 10 can more effectively mitigate local heat generation, and can more effectively mitigate a local increase in magnetic flux density of the magnetic body 100.

With the above-described configuration, the switching power supply system device 80 including the planar array inductor 10 can mitigate heat generation, reduce an output voltage ripple in the switching power supply system device 80, and mitigate generation of electromagnetic noise by changing a peak value of a current. As a result, the switching power supply system device 80 including the planar array inductor 10 can realize a high-efficiency and high-performance switching power supply system device in which heat generation is mitigated.

Figure 8:
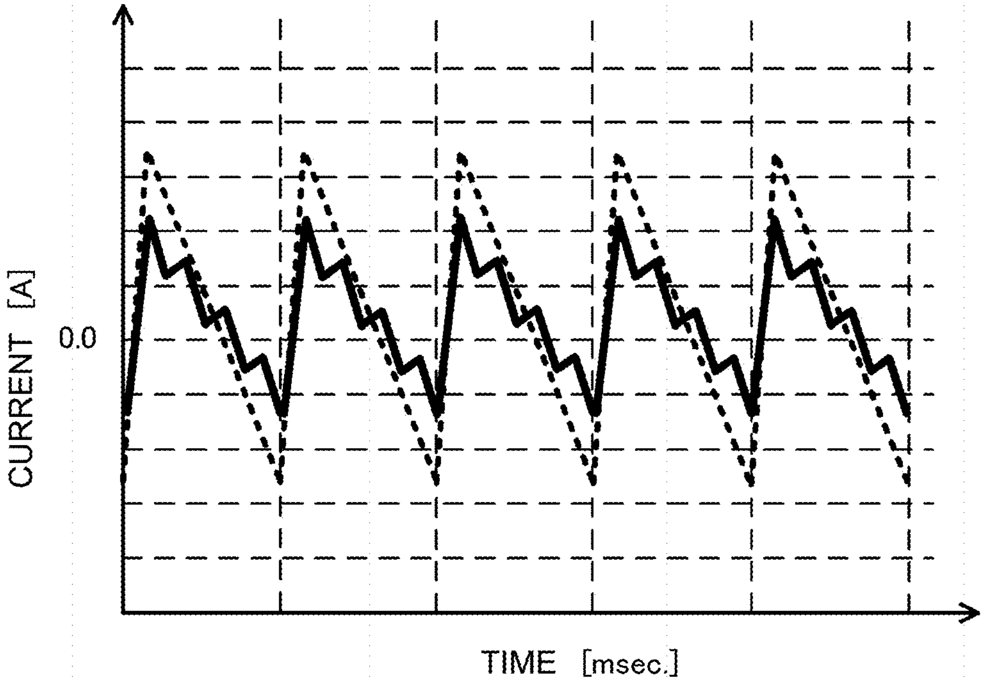
FIG. 8 is a graph illustrating a change with time in output current value when multi-phase control is performed and when the multi-phase control is not performed.

Further, by performing the multi-phase control, the switching power supply system device 80 can also obtain the following operational effect. FIG. 8 is a graph illustrating a change in output current value along time in a case that the multi-phase control is performed and in a case that the multi-phase control is not performed. In FIG. 8, a solid line indicates the case that the multi-phase control is performed, and a broken line indicates the case that the multi-phase control is not performed.

As illustrated in FIG. 8, the peak value of the current can be made lower than in the case that the multi-phase control is not performed, and the difference between the maximum value and the minimum value of the current can be made smaller. As a result, the planar array inductor 10 can further mitigate heat generation and reduce an output voltage ripple.

(Structure of Switching Power Supply System Device 80)

Figure 9:
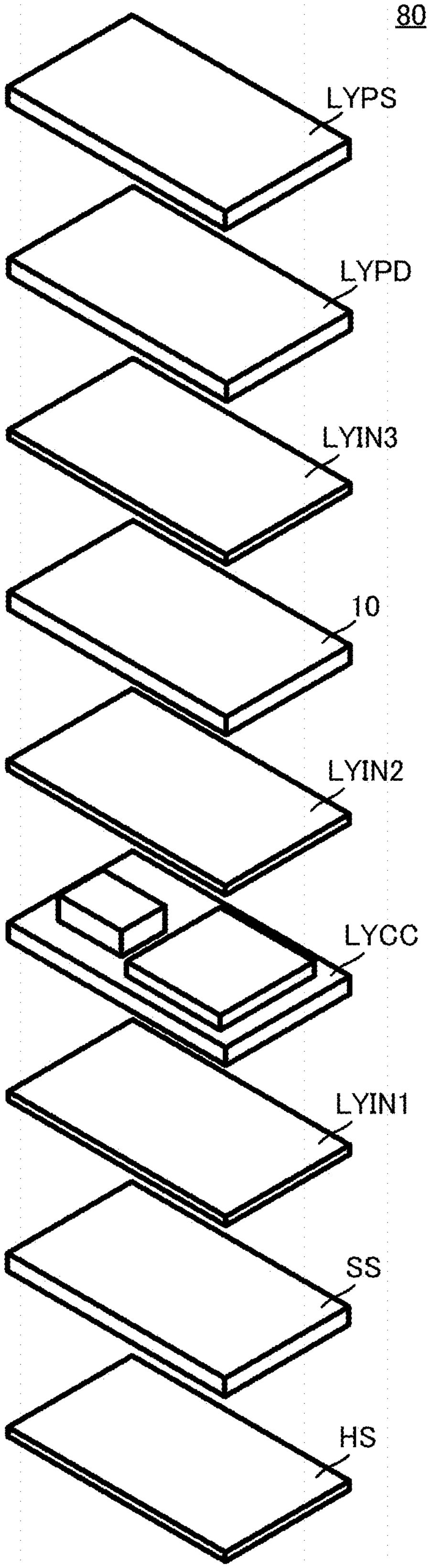
FIG. 9 is an exploded perspective view illustrating an example of a structure of the switching power supply system device according to the first embodiment of the present disclosure.

FIG. 9 is an exploded perspective view illustrating an example of a structure of the switching power supply system device according to the first embodiment of the present disclosure.

As illustrated in FIG. 9, the switching power supply system device 80 includes a heat sink HS, a semiconductor substrate SS, an insulating layer LYIN1, a control circuit layer LYCC, an insulating layer LYIN2, the planar array inductor 10, an insulating layer LYIN3, a power device layer LYPD, and a passivation layer LYPS, which are laminated in this order. The control circuit layer LYCC includes the switching control circuit 800 and the multiple driver circuits 810, 820, 830, and 840. The power device layer LYPD includes the switching elements of the multiple power conversion circuits 81, 82, 83, and 84.

As described above, the switching power supply system device 80 is realized in a shape in which multiple functional layers are laminated. At this time, since the multiple inductors 11, 12, 13, and 14 are formed by the planar array inductor 10, the switching power supply system device 80 can realize a structure in which the above-described multiple functional layers are laminated.

With the structure above, the switching power supply system device 80 can be reduced in planar area.

Although an aspect in which the above-described planar array inductor 10 uses the winding conductor being substantially rectangular in plan view, the planar shape of the winding conductor is not limited thereto. For example, the planar shape of the winding conductor may be a circular shape or the like.

Second Embodiment

A switching power supply system device including a planar array inductor according to a second embodiment of the present disclosure will be described with reference to the drawings.

Figure 10:
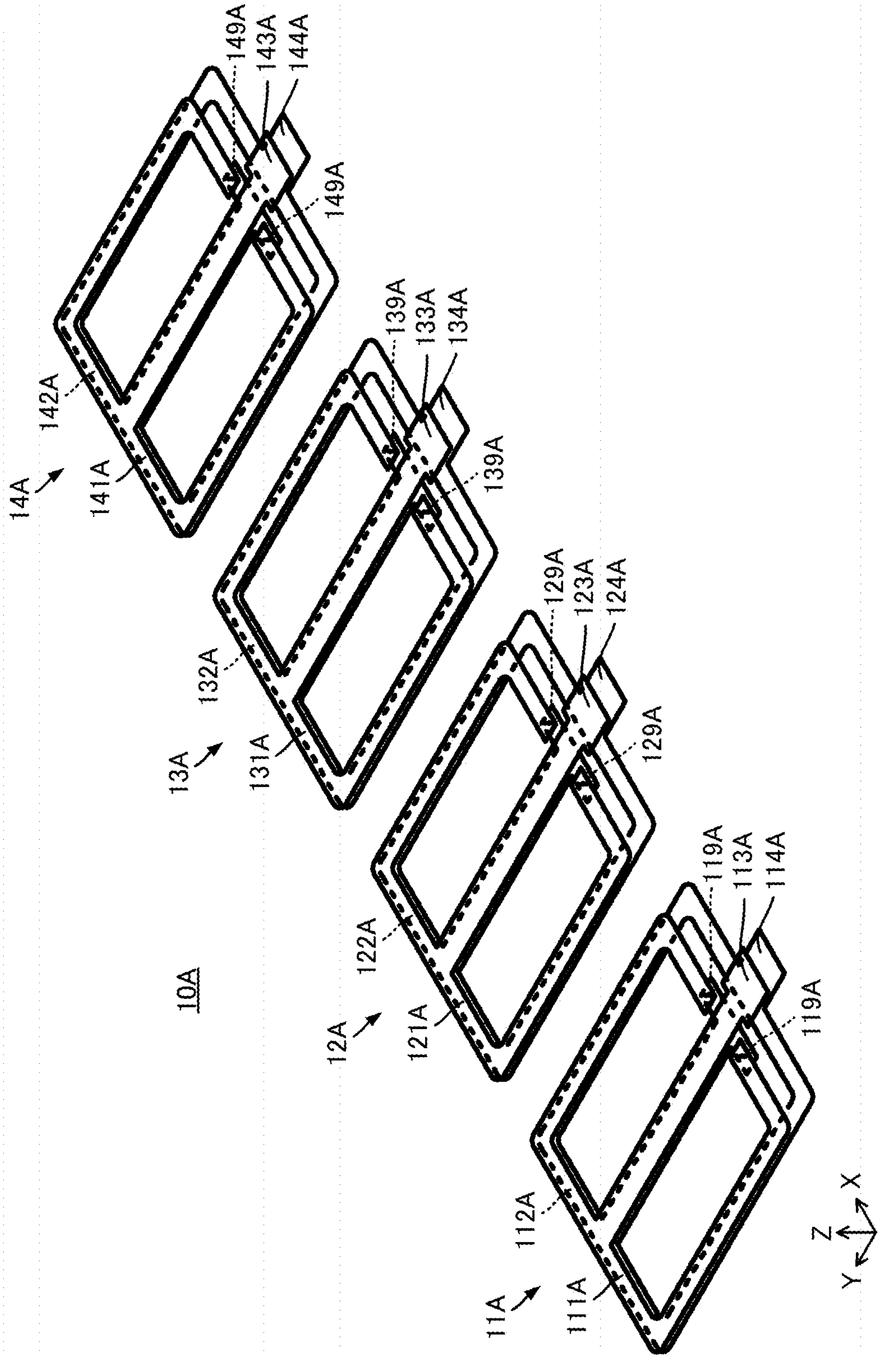
FIG. 10 is a perspective view of multiple windings of a planar array inductor according to a second embodiment of the present disclosure.
Figure 11:
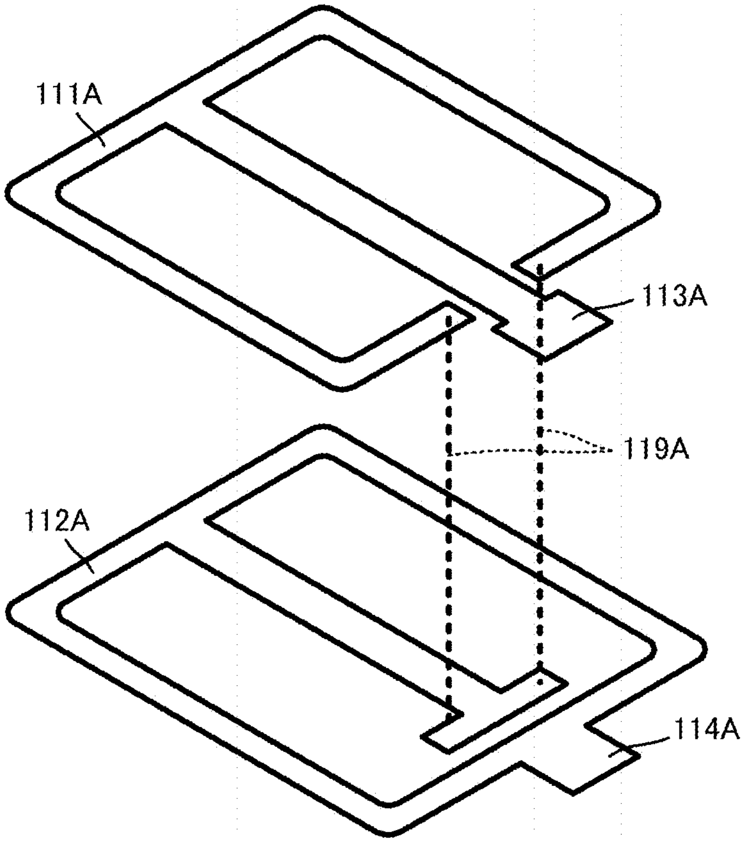
FIG. 11 is an exploded perspective view of one inductor constituting the planar array inductor according to the second embodiment of the present disclosure.

FIG. 10 is a perspective view of multiple windings of the planar array inductor according to the second embodiment of the present disclosure. FIG. 11 is an exploded perspective view of one inductor constituting the planar array inductor according to the second embodiment of the present disclosure.

As illustrated in FIGS. 10 and 11, a planar array inductor 10A according to the second embodiment is different from the planar array inductor 10 according to the first embodiment in the shape of the winding conductor. Other configurations of the planar array inductor 10A are the same as those of the planar array inductor 10, and the description of the same portion will be omitted.

The planar array inductor 10A includes multiple inductors 11A, 12A, 13A, and 14A. The multiple inductors 11A, 12A, 13A, and 14A are each a so-called center-tapped winding.

A winding portion of the inductor 11A includes winding conductors 111A and 112A. The winding conductors 111A and 112A are formed by a center conductor and two winding conductors disposed on both sides of the center conductor. The winding conductors 111A and 112A are coupled to each other via an interlayer via conductor 119A. The winding conductors 111A and 112A are laminated and bonded with a small gap therebetween with an adhesive, which is not illustrated. A pad conductor 113A is coupled to the winding conductor 111A, and a pad conductor 114A is coupled to the winding conductor 112A.

The winding portion of the inductor 12A includes winding conductors 121A and 122A, an interlayer via conductor 129A, and pad conductors 123A and 124A, and has the same configuration as the winding portion of the inductor 11A.

The winding portion of the inductor 13A includes winding conductors 131A and 132A, an interlayer via conductor 139A, and pad conductors 133A and 134A, and has the same configuration as the winding portion of the inductor 11A.

The winding portion of the inductor 14A includes winding conductors 141A and 142A, an interlayer via conductor 149A, and pad conductors 143A and 144A, and has the same configuration as the winding portion of the inductor 11A.

The respective winding portions of the inductors 11A, 12A, 13A, and 14A are disposed in an array in a planar manner as illustrated in FIG. 10. The respective winding portions of the inductors 11A, 12A, 13A, and 14A are covered with a magnetic body (a planar core), which is not illustrated. The magnetic body has no gap inside.

With the configuration above, the planar array inductor 10A can achieve the same operational effects as those of the planar array inductor 10. Further, since the planar array inductor 10A has the center-tapped winding, magnetic coupling between adjacent windings can be mitigated. As a result, the planar array inductor 10A can shorten a distance between adjacent windings and can make the planar shape small.

<1> A switching power supply system device including a planar array inductor. The switching power supply system device includes a power conversion unit configured to couple multiple power conversion circuits in parallel and to obtain an output voltage by combining currents output by respective switching operations; a switching control circuit configured to control the switching operations; and a planar array inductor including multiple power inductors constituting the multiple power conversion circuits. The planar array inductor includes a planar core, and multiple windings formed in an array relative to the planar core. Each of the multiple windings uses multiple layers of copper foil wiring lines laminated with a nonmagnetic and non-conductive adhesive layer interposed therebetween, and adjacent copper foil wiring lines in the multiple copper foil wiring lines are electrically coupled to each other using an interlayer via conductor. The planar core is in close contact with the multiple windings in a shape covering the multiple windings on an inner side portion and an outer side portion of each of the multiple windings. The switching control circuit performs control such that in an entire switching period for a series of switching operations based on the respective switching operations, a peak value of a current flowing through each of the multiple windings periodically changes, a winding in the multiple windings with the peak value of the current is consecutively moved with elapse of time to control periodic entire switching operations, and, in the planar core, a position and time at which density of magnetic flux becomes maximum are periodically moved, the magnetic flux being generated by the current of each of the multiple windings, and heat generated in the planar core and heat generated in the multiple windings are integrated using thermal conduction and are uniformly distributed in a planar manner, and a local increase in magnetic flux density in the planar core and local heat generation are mitigated.

<2> The switching power supply system device including the planar array inductor according to <1>, wherein the sheet-shaped magnetic material is a metal composite material.

<3> The switching power supply system device including the planar array inductor according to <1> or <2>, wherein the planar array inductor includes an outer electrode formed by forming a laser via in the sheet-shaped magnetic material and performing metal plating.

<4> The switching power supply system device including the planar array inductor according to <3>, wherein the outer electrode uses plating of gold or nickel.

<5> The switching power supply system device including the planar array inductor according to any one of <1> to <4>, wherein the multiple windings are each a center-tapped winding.

<6> The switching power supply system device including the planar array inductor according to any one of <1> to <4>, wherein the multiple windings are each a helical winding.

<7> The switching power supply system device including the planar array inductor according to any one of <1> to <6>, wherein the interlayer via conductor is a copper foil.

<8> The switching power supply system device including the planar array inductor according to any one of <1> to <7>, wherein the planar core includes a thermosetting resin base material, and multiple magnetic particles mixed in the resin base material and each covered with an insulating resin.

<9> The switching power supply system device including the planar array inductor according to any one of <1> to <8>, wherein the planar core is formed with a sheet-shaped magnetic material being pressure-bonded and thermally cured on the inner side portion and the outer side portion of each of the multiple windings.

<10> The switching power supply system device including the planar array inductor according to any one of <1> to <9>, wherein the switching control circuit controls a current flowing through each of the multiple windings by performing multi-phase control on an output current.

What is claimed is:

1. A switching power supply system device including a planar array inductor, the switching power supply system device comprising:

a power conversion unit configured to couple multiple power conversion circuits in parallel and to obtain an output voltage by combining currents output by respective switching operations;

a switching control circuit configured to control the switching operations; and a planar array inductor including multiple power inductors configuring the multiple power conversion circuits, wherein the planar array inductor includes a planar core, and multiple windings configured in an array relative to the planar core, each of the multiple windings uses multiple layers of copper foil wiring lines laminated with a nonmagnetic and non-conductive adhesive layer interposed therebetween, and adjacent copper foil wiring lines in the multiple copper foil wiring lines are electrically coupled to each other using an interlayer via conductor, the planar core is in close contact with the multiple windings in a shape covering the multiple windings on an inner side portion and an outer side portion of each of the multiple windings, and the switching control circuit is configured to perform control such that in an entire switching period for a series of switching operations based on the respective switching operations, a peak value of a current flowing through each of the multiple windings periodically changes, a winding in the multiple windings with the peak value of the current is consecutively moved with elapse of time to control periodic entire switching operations, and, in the planar core, a position and time at which density of magnetic flux becomes maximum are periodically moved, the magnetic flux being generated by the current of each of the multiple windings, and heat generated in the planar core and heat generated in the multiple windings are integrated using thermal conduction and are uniformly distributed in a planar manner, and a local increase in magnetic flux density in the planar core and local heat generation are mitigated.

2. The switching power supply system device including the planar array inductor according to claim 1, wherein the planar core includes a sheet-shaped magnetic material that is a metal composite material.

3. The switching power supply system device including the planar array inductor according to claim 1, wherein the planar core includes a sheet-shaped magnetic material; and the planar array inductor includes an outer electrode configured of a laser via in the sheet-shaped magnetic material, the laser via being metal plated.

4. The switching power supply system device including the planar array inductor according to claim 3, wherein the outer electrode includes plating of gold or nickel.

5. The switching power supply system device including the planar array inductor according to claim 1, wherein the multiple windings are each a center-tapped winding.

6. The switching power supply system device including the planar array inductor according to claim 1, wherein the multiple windings are each a helical winding.

7. The switching power supply system device including the planar array inductor according to claim 1, wherein the interlayer via conductor is a copper foil.

8. The switching power supply system device including the planar array inductor according to claim 1, wherein the planar core includes a thermosetting resin base material, and multiple magnetic particles mixed in the resin base material and each covered with an insulating resin.

9. The switching power supply system device including the planar array inductor according to claim 1, wherein the planar core includes a sheet-shaped magnetic material being pressure-bonded and thermally cured on the inner side portion and the outer side portion of each of the multiple windings.

10. The switching power supply system device including the planar array inductor according to claim 1, wherein the switching control circuit is configured to control a current flowing through each of the multiple windings by performing multi-phase control on an output current.

11. The switching power supply system device including the planar array inductor according to claim 2, wherein the planar array inductor includes an outer electrode configured of a laser via in the sheet-shaped magnetic material, the laser via being metal plated.

12. The switching power supply system device including the planar array inductor according to claim 2, wherein the multiple windings are each a center-tapped winding.

13. The switching power supply system device including the planar array inductor according to claim 3, wherein the multiple windings are each a center-tapped winding.

14. The switching power supply system device including the planar array inductor according to claim 2, wherein the multiple windings are each a helical winding.

15. The switching power supply system device including the planar array inductor according to claim 3, wherein the multiple windings are each a helical winding.

16. The switching power supply system device including the planar array inductor according to claim 2, wherein the interlayer via conductor is a copper foil.

17. The switching power supply system device including the planar array inductor according to claim 3, wherein the interlayer via conductor is a copper foil.

18. The switching power supply system device including the planar array inductor according to claim 2, wherein the planar core includes a thermosetting resin base material, and multiple magnetic particles mixed in the resin base material and each covered with an insulating resin.

19. The switching power supply system device including the planar array inductor according to claim 2, wherein the planar core includes a sheet-shaped magnetic material being pressure-bonded and thermally cured on the inner side portion and the outer side portion of each of the multiple windings.

20. The switching power supply system device including the planar array inductor according to claim 2, wherein the switching control circuit is configured to control a current flowing through each of the multiple windings by performing multi-phase control on an output current.

* * * * *